United States Patent [19]

Maurer

[11] Patent Number: 4,721,492

[45] Date of Patent: Jan. 26, 1988

[54] OVERLOAD COUPLING HAVING A RADIALLY VARIABLE COUPLING GEAR

[75] Inventor: Ruprecht Maurer, Bad Homburg, Fed. Rep. of Germany

[73] Assignee: Ringspann Albrecht Maurer K.G., Homburg, Fed. Rep. of Germany

[21] Appl. No.: 8,085

[22] Filed: Jan. 21, 1987

Related U.S. Application Data

[63] Continuation of Ser. No. 817,691, Jan. 10, 1986, abandoned.

[30] Foreign Application Priority Data

Jan. 26, 1985 [DE] Fed. Rep. of Germany ....... 3502666

[51] Int. Cl.$^4$ ................................................. F16D 7/04
[52] U.S. Cl. ......................................... 464/38; 464/30
[58] Field of Search ............ 192/56 R, 108; 403/367, 403/368, 371, 372; 464/30, 36, 37, 38, 39, 147, 149, 157, 158, 180

[56] References Cited

U.S. PATENT DOCUMENTS

| | | | |
|---|---|---|---|
| 2,429,091 | 10/1947 | Dodge et al. ................... | 464/38 X |
| 2,477,521 | 7/1949 | Martin ............................. | 464/39 |
| 2,546,633 | 3/1951 | Dodge ............................. | 464/39 X |
| 2,873,129 | 2/1959 | Edmundson ................... | 403/367 X |
| 3,942,337 | 3/1976 | Leonard et al. ............... | 464/36 |
| 4,307,797 | 12/1981 | Belansky ...................... | 192/108 |
| 4,311,224 | 1/1982 | Kato et al. .................... | 464/36 X |

FOREIGN PATENT DOCUMENTS

| | | | |
|---|---|---|---|
| 2744908 | 4/1979 | Fed. Rep. of Germany ........ | 464/38 |
| 606143 | 6/1926 | France ............................. | 403/368 |
| 631472 | 6/1929 | France ............................. | 192/108 |
| 237460 | 8/1945 | Switzerland . | |

Primary Examiner—Daniel P. Stodola
Attorney, Agent, or Firm—Edwin E. Greigg

[57] ABSTRACT

An overload coupling having coaxially arranged coupling halves. At least one of the coupling halves is axially displaceable and is held by spring force in form-fitting engagement with the other, and the coupling halves have a face gear on their facing ends for effecting the form-fitting engagement. The flanks of the gear-tooth system that rest on one another during torque transmission generate an axial force component, which acts in the direction of disengagement, and a radial force component. The axially displaceable coupling half is embodied such that it is radially variable counter to a restoring force.

11 Claims, 6 Drawing Figures

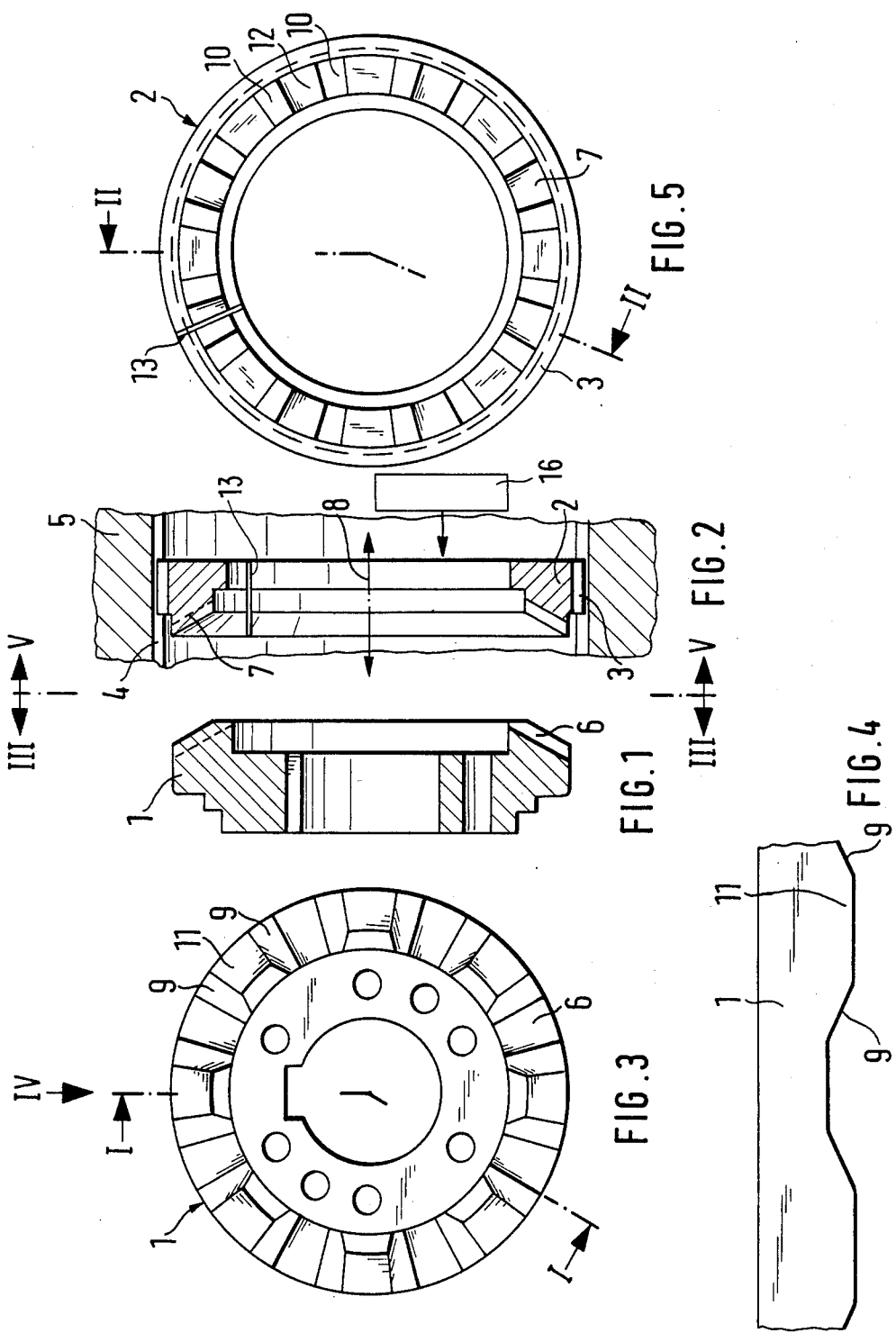

OVERLOAD COUPLING HAVING A RADIALLY VARIABLE COUPLING GEAR

This is a continuation of copending application Ser. No. 817,691 filed Jan. 10, 1986, now abandoned.

BACKGROUND OF THE INVENTION

The invention relates to an overload coupling or clutch having coaxially arranged coupling or clutch halves, at least one of which is axially displaceable and is held in form-fitting engagement with the other by means of a spring force, and having a face gear on their facing ends for effecting the form-fitting engagement, wherein the flanks of the gear-tooth system that rest on one another during transmission of a torque generate an axial force component acting in the direction of disengagement and a radial force component.

Overload couplings of this type, such as are known from German Offenlegungsschrift DE-OS No. 27 44 908, serve as safety devices for machines and systems, so as to limit the torque at a suitable point in the drive train to a value at which damage will not yet occur. The face gears are pressed against one another by a predetermined, optionally adjustable axial force, and the transmitted torque, in accordance with the angle of engagement of the face gear, generates the axial force component which tends to drive the gear-tooth system apart. Therefore, as soon as the torque-dependent force exceeds the predetermined maximum force, the displaceable half of the coupling moves axially until such time as the gear-tooth system becomes disengaged and the coupling rotates freely or shuts off. However, the invention is also applicable to known coupling structures, operating in the same way, in which the teeth of one coupling half, or transmission elements meshing in a form-fitting manner with the gear-tooth systems of both coupling halves, are embodied as roller bodies.

An overload coupling of the type mentioned at the outset above is known from Swiss Pat. No. 237 460. It differs from the above-mentioned structure in that the flanks of the face gear are embodied as helical surfaces, which also encompasses arrangements of the helical surfaces which in addition to an axial force component also generate the above-mentioned radial force component. Embodying the flanks as helical surfaces serves to overcome the situation, which is otherwise present in overload couplings of the type under discussion here, in which the linear or areal contact of adjacent flanks that prevails when the coupling is engaged is lost, except for a point or edge contact, during the disengagement of the coupling, which is just the time when the load is at a maximum; the reason for this is that because of the obliquity of the flanks, the axial movement of the shiftable coupling half also involves a rotational movement, which causes associated flanks to be pivoted against one another.

A common feature of all the overload couplings described in the prior art is that the shiftable coupling half is rotationally connected in an axially displaceable way with the structural parts that support or adjoin it; this can be achieved by means of a serration, for instance, which will be the term used hereinafter for the sake of simplicity, but this term is understood to imply no restriction as to other structural forms of axially displaceable rotational connections. Solely in terms of manufacturing engineering, this serration dictates the shiftable coupling half will have play with respect to the structural part supporting it, especially when the coupling is in the engaged condition, so that the degree of angular accuracy in the rotational movement transmitted by the coupling that is needed in order to meet exacting requirements is impossible to attain. This angular accuracy is becoming increasingly significant, however, for instance in drive mechanisms with stepping motors for numerically controlled machines.

OBJECT AND SUMMARY OF THE INVENTION

It is accordingly the object of the invention to embody an overload coupling of the above type in such a way, using simple means, that freedom from play between axially displaceable coupling halves and the structural parts supporting them is assured while the coupling is in the torque-transmitting state.

This object is attained in accordance with the invention in that the axially displaceable coupling half is embodied as radially variable counter to a restoring force.

By these provisions of the invention, the axially displaceable coupling half is capable of varying its diameter under the influence of the radial force component and of bracing itself against the serration, or against the structural part supporting the coupling half to effect a play-free rotational connection, as long as torque is being transmitted. By embodying the face gear accordingly, the magnitude of the radial force component can be accurately predetermined such that the disengagement of the coupling, an operation which otherwise takes place under maximum axial load, can take place in the desired manner or at the intended maximum moment. The restoring force mentioned above, on the other hand, assures that when the coupling is disengaged, the radial variation of the axially displaceable coupling half is temporarily rescinded, so that when the coupling re-engages there will be no jamming between the displaceable coupling half and the structural part supporting it.

For the invention, it is unimportant whether the flanks of the face gear are embodied as flat surfaces or as helical surfaces, or whether flanks of the gear-tooth system that are resting on one another touch only along a line or over an areal surface. What is important is only that the flanks be embodied and arranged in such a way that along with the axial force component, the radial force component is also produced as well. Under the same preconditions, the invention also applies equally to coupling halves arranged in axial sequence and to structures in which the coupling halves are substantially telescoped coaxially inside each other when in the engaged state. Finally, the characteristic of radial variability of the axially displaceable coupling half encompasses both an increase and a decrease in diameter, the necessity for either of which depends substantially on whether the coupling half is disposed such that it is axially displaceable *on* the structural part supporting it, or *in* it.

It has proved useful for the restoring force to be a spring force. This spring force may be provided by the elasticity of the material making up the coupling half, which is particularly appropriate for cases where the coupling half can be made of plastic or the like. Furthermore, it may be advantageous for the axially displaceable coupling half to have at least one radial separation section. If such a section is embodied such that it is continuous, then the axially displaceable coupling half is resiliently variable outward or inward in its diameter, in the manner of a snap ring. If a plurality of separation sections distributed over the circumference of the coupling half are driven only partly forward radially from the inside and/or from the outside into the material of which the coupling half is made, then it is possible to furnish adequate circumferential elasticity for the purposes of the invention for a coupling half made by way of example from plastic.

However, the coupling half can also comprise a plurality of segments disposed over the circumference; here, as well as in the other structural forms, if the coupling half is made of metal it is advantageous if the parts of the couplng halves can have a rubber-to-metal connection at the locations where they meet.

The invention will be better understood and further objects and advantages thereof will become more apparent from the ensuing detailed description of a preferred embodiment taken in conjunction with the drawings.

BRIEF DESCRIPTION OF THE DRAWINGS

FIGS. 1 and 2 show two coupling halves arranged in axial alignment with one another, in radial section with the coupling half of FIG. 2 forced toward the coupling half of FIG. 1 by a spring;

FIG. 3 is a sectional view taken along the line III—III of the coupling half shown in FIG. 1;

FIG. 4 is an enlarged detail of the view along the line IV in FIG. 3; and

FIG. 5 is a sectional view taken along the line V—V through the coupling half shown in FIG. 2.

DESCRIPTION OF THE PREFERRED EMBODIMENT

Figure 6:
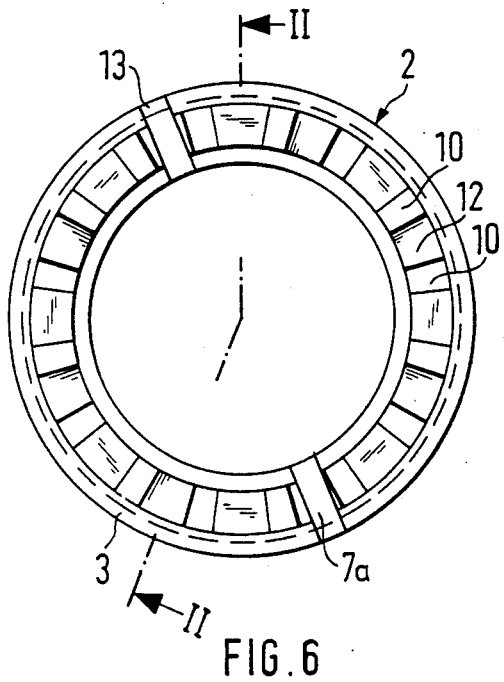
FIG. 6 is a modification of the coupling half shown in FIG. 5.

FIGS. 1 and 2 show two coupling halves 1 and 2 arranged in axial alignment with one another, in radial section. Of these, the coupling half 1 is rotatable, but fixed axially on the rotary shaft while the coupling half 2 is axially displaceable via an external gear-tooth system 3 in a serration 4 of a structural part 5 that supports it; this part 5 is shown only fragmentarily in the drawing. On the ends facing one another, the coupling halves 1 and 2 have face gears 6, 7, which mesh with one another whenever the coupling is engaged, that is, whenever the coupling half 2 is displaced toward the left, as seen in the drawing, toward the coupling half 1. This displacement movement in the direction of the double-headed arrow 8 for engaging and disengaging the coupling is effected via a known mechanism, which is accordingly not shown, against which the coupling half 2 is supported via one or more springs 16. Thus when the maximum torque that the coupling is capable of transmitting is reached, the gear-tooth system 7 of this coupling half 2 can move to the right, overcoming this spring force as the coupling half 2 is simultaneously displaced, and become disengaged from the gear-tooth system 6 of the coupling half 1; this disengages the coupling. The gear teeth on each gear face 6, 7 may be in the form of rollers which mesh in a form fitting manner.

To generate this axial force that effects the disengagement of the coupling, the contacting flanks 9, 10 of the teeth 11, 12 of the gear-tooth systems 6, 7 are placed obliquely in the circumferential direction, as is best seen in the end views of the coupling halves 1, 2 provided in FIGS. 3 and 5.

As best seen in FIGS. 1 and 2, the gear-tooth systems 6, are also placed obliquely with respect to the radial direction of the coupling halves 1, 2, as a result of which a radial force component additionally arises between the coupling halves 1, 2 during torque transmission. This radial force component is utilized for radially expanding the axially displaceable coupling half 2 during the torque transmission, so that its external gear-tooth system 3 is braced without play in the serration 4. To this end, as shown particularly in FIG. 5, the coupling half 2 has a radial separation section 13, as a result of which the coupling half 2 can enlarge its diameter in the manner of a snap ring under the influence of the radial force component.

Once the coupling is disengaged and the radial force component accordingly disappears, then because of the inherent elasticity of its material, the coupling half 2 resiliently returns to the state shown in FIG. 5, in which the play between the external gear-tooth system 3 and the serration 4 that is dictated by manufacturing considerations exists, so that it is easy to displace the coupling half 2 back to the left as seen in FIG. 2 in order to engage the coupling.

In a modification shown in FIG. 6 of the structural form of the coupling half 2 shown in FIGS. 2 and 5, a plurality of separation sections 13 can also be provided, distributed over the circumference of the coupling half 2, so that the coupling half is divided up into a plurality of segments, which must then be joined at the separation sections 13 by means of rubber-elastic to metal elements as shown at 7a. In other cases, however, in which the material comprising the coupling half has sufficient inherent elasticity, one or more separation sections 13 can also be dispensed with entirely.

The drawing illustrates one example of the expansion of the coupling half 2 under a torque load by means of an outwardly directed radial force component of the gear-tooth system 6, 7. Naturally it is also possible in the same manner, with a correspondingly different structural form, to effect a diameter reduction, for instance if the coupling half 2 is axially displaceable on the serration of a shaft that supports it.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An overload coupling having coaxially arranged first and second coupling halves in axial alignment, said second coupling half supported in a structural part, said structural part including serrations on its inner circumference that forms a fitting sliding engagement with serrations on an outer circumference of said second coupling half, said second coupling half is axially displaceable and is held in form-fitting engagement with said first coupling half by means of at least one spring, a face gear disposed on corresponding facing surfaces of said first and second coupling halves for effecting a mutual form-fitting engagement of said first and second coupling halves, each of said face gears includes flanks wherein the flanks of said face gears rest on one another during transmission of a torque and generate an axial force component acting in a direction of disengagement of said second coupling half from said first coupling half and a radial force component toward said structural part, and said axially displaceable second coupling half includes at least one radial separation section (13) and a restoring force, and said second coupling half during transmission of torque is radially variable counter to said restoring force and when said first and second coupling halves are engaged circumferential play between said serrations on said structural part and said second coupling are eliminated.

2. An overload coupling as defined by claim 1, in which said axially displaceable second coupling half comprises a plurality of segments distributed over its gear face.

3. An overload coupling as defined by claim 1, wherein said radial separation of said axially displaceable second coupling half has a rubber-to-metal connection at the separation locations.

4. An overload coupling as defined by claim 3, in which said axially displaceable second coupling half comprises a plurality of segments distributed over its gear face.

5. An overload coupling as defined by claim 1, in which the restoring force is a spring force.

6. An overload coupling as defined by claim 5, in which said axially displaceable second coupling half comprises a plurality of segments distributed over its gear face.

7. An overload coupling as defined by claim 5, wherein said radial separation of said axially displaceable second coupling half has a rubber-to-metal connection at the separation locations.

8. An overload coupling as defined by claim 7, in which said axially displaceable second coupling half comprises a plurality of segments distributed over its gear face.

9. An overload coupling as defined by claim 5, in which the restoring force is provided by an elasticity of the material from which said axially displaceable second coupling half is formed.

10. An overload coupling as defined by claim 9, wherein said radial separation of said axially displaceable second coupling half has a rubber-to-metal connection at the separation locations.

11. An overload coupling as defined by claim 10, in which said axially displaceable second coupling half comprises a plurality of segments distributed over its gear face.

* * * * *